(12) United States Patent
Yamada

(10) Patent No.: US 11,317,066 B2
(45) Date of Patent: Apr. 26, 2022

(54) PHASE MODULATION ELEMENT AND DISPLAY DEVICE

(71) Applicant: SEIKO EPSON CORPORATION, Tokyo (JP)

(72) Inventor: Fumika Yamada, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/037,204

(22) Filed: Sep. 29, 2020

(65) Prior Publication Data

US 2021/0099681 A1 Apr. 1, 2021

(30) Foreign Application Priority Data

Sep. 30, 2019 (JP) .............................. JP2019-178866

(51) Int. Cl.
*G02B 27/00* (2006.01)
*G02B 5/18* (2006.01)
*H04N 9/31* (2006.01)
*G02B 5/02* (2006.01)

(52) U.S. Cl.
CPC ......... *H04N 9/3152* (2013.01); *G02B 5/0215* (2013.01); *G02B 5/0278* (2013.01); *G02B 2207/101* (2013.01); *H04N 9/3164* (2013.01)

(58) Field of Classification Search
CPC ................. G02B 5/1866; G02B 5/1833; G02B 27/0025; G02B 2005/1804; G02B 5/1871; G02B 5/1809; G02B 5/1861; H04N 9/3152; G03B 21/208
See application file for complete search history.

(56) References Cited

U.S. PATENT DOCUMENTS

2019/0154877 A1   5/2019  Capasso et al.
2020/0096833 A1*  3/2020  Lee ...................... G02B 5/1866

FOREIGN PATENT DOCUMENTS

JP    2001-66499 A    3/2001
JP    2017-198845 A   11/2017
JP    2019-516128 A    6/2019

* cited by examiner

*Primary Examiner* — Ryan D Howard
(74) *Attorney, Agent, or Firm* — Dority & Manning, P.A.

(57) ABSTRACT

A phase modulation element of the present disclosure includes a substrate, and a plurality of columnar structures formed from a dielectric material provided at a first surface of the substrate, wherein the plurality of columnar structures have a refractive index and a pitch that produce a waveguide effect for incident light including a first light component and a second light component, the first surface of the substrate includes a first region provided with a plurality of first columnar structures that modulate phase for the first light component, and a second region provided with a plurality of second columnar structures that modulate phase for the second light component having parameters different from parameters of the first light component.

11 Claims, 7 Drawing Sheets

PHASE MODULATION ELEMENT AND DISPLAY DEVICE

The present application is based on, and claims priority from JP Application Serial Number 2019-178866, filed Sep. 30, 2019, the disclosure of which is hereby incorporated by reference herein in its entirety.

BACKGROUND

1. Technical Field

The present disclosure relates to a phase modulation element and a display device.

2. Related Art

For example, in a display device such as a projector, in order to improve display quality, a phase modulation element is used that corrects various aberrations produced by an optical element such as a lens by modulating phase of light in some cases. JP-T-2019-516128 below discloses a metalens including a substrate and a plurality of nanostructures disposed on the substrate, in which an optical phase shift changes depending on a position of the nanostructure.

In order to achieve aberration correction with a small optical element with high precision, it is conceivable to use a phase modulation element such as the metalens of JP-T-2019-516128. However, in the metalens of JP-T-2019-516128, sizes and orientations of the plurality of nanostructures change, depending on positions for incident light having a specific parameter such as a specific wavelength or a specific incident angle. Thus, even when the metalens of JP-T-2019-516128 is used, there has been a problem in that it is difficult to appropriately perform aberration correction for light including a plurality of light components having different parameters from each other.

SUMMARY

In order to solve the above-described problem, a phase modulation element according to one aspect of the present disclosure includes a substrate, and a plurality of columnar structures provided at a first surface of the substrate, wherein the plurality of columnar structures have a refractive index and a pitch that produce a waveguide effect for incident light including a first light component, and a second light component having characteristic parameters different from characteristic parameters of the first light component, the first surface of the substrate includes a first region provided with a plurality of first columnar structures that modulate phase for the first light component, and a second region provided with a plurality of second columnar structures that modulate phase for the second light component.

In a phase modulation element according to one aspect of the present disclosure, the first light component and the second light component may be different from each other in at least one characteristic parameter among a wavelength, an incident angle, and a polarization state.

In a phase modulation element according to one aspect of the present disclosure, the first columnar structure and the second columnar structure may be different from each other in at least one structural parameter among a diameter, a pitch, a height, and a shape.

In a phase modulation element according to one aspect of the present disclosure, a configuration may adopted in which, when the substrate is viewed from an exit direction of the incident light, a shape of the substrate is circular, and the first region and the second region are disposed in any configuration of a concentric circle, a lattice, a sector-like shape, and an irregular-shape.

In a phase modulation element according to one aspect of the present disclosure, a configuration may be adopted in which, the substrate includes a light-transmitting substrate having a first surface and a second surface, the plurality of columnar structures are provided at a first surface of the light-transmitting substrate, the incident light is incident on one of the first surface and the second surface of the light-transmitting substrate, and exits from another of the first surface and the second surface.

In a phase modulation element according to one aspect of the present disclosure, a configuration may be adopted in which, the substrate includes a spacer layer having a first surface and a second surface, and a reflection layer, the plurality of columnar structures are provided at a first surface of the spacer layer, the reflection layer is provided at a second surface of the spacer layer, and the incident light is incident on the first surface of the spacer layer, and reflected by the reflection layer, and moreover exits from the first surface of the spacer layer.

A display device according to one aspect of the present disclosure includes a phase modulation element according to one aspect of the present disclosure.

DESCRIPTION OF EXEMPLARY EMBODIMENTS

First Exemplary Embodiment

A first exemplary embodiment of the present disclosure will be described below with reference to FIG. 1 to FIG. 9.

In the present exemplary embodiment, a projector is described as an example of a display device.

Figure 1:
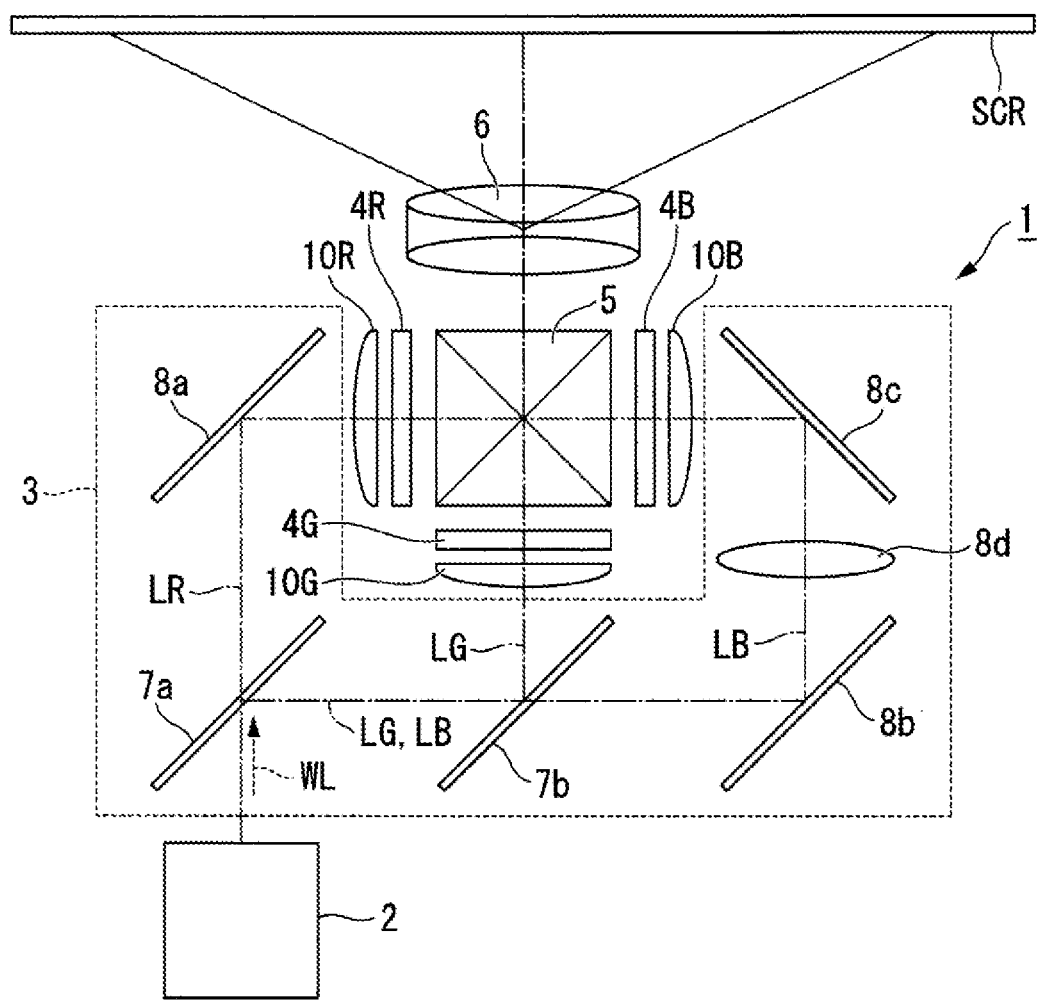
FIG. 1 is a schematic configuration diagram of a projector according to a first exemplary embodiment.

FIG. 1 is a schematic configuration diagram illustrating the projector according to the first exemplary embodiment.

Figure 2:
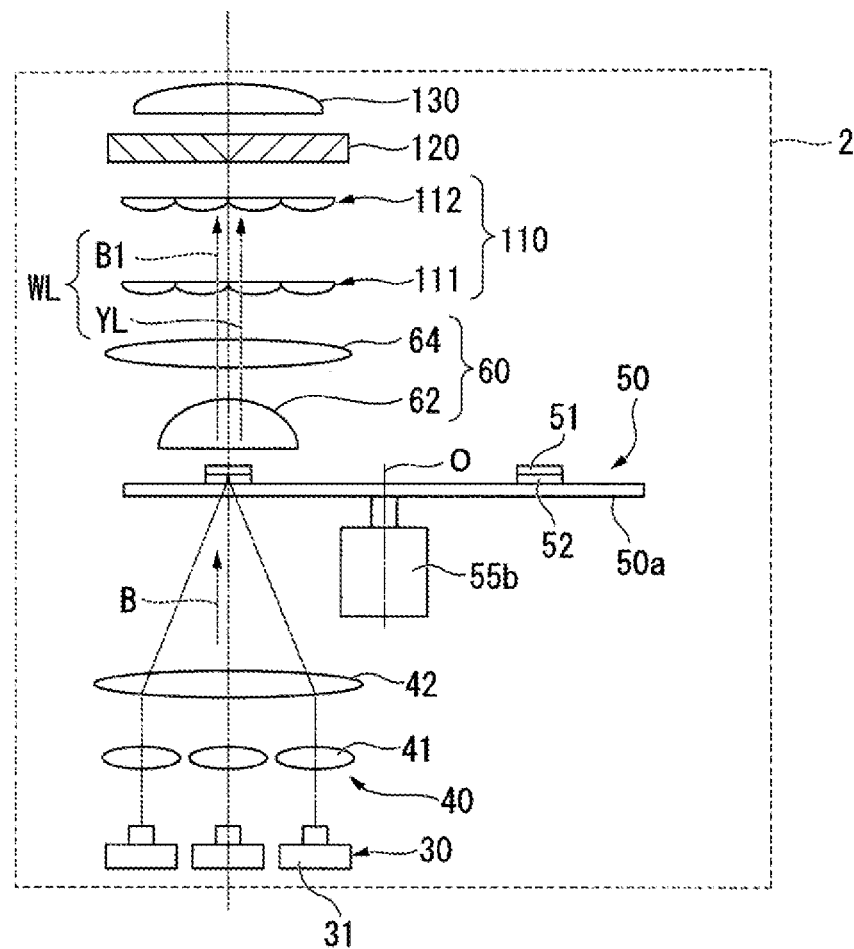
FIG. 2 is a schematic configuration diagram of an illumination device.

FIG. 2 is a side view of an illumination device.

Note that, in the drawings, the dimensions of some components may be scaled differently for ease of understanding for the components.

The projector of the present exemplary embodiment is an example of a projector that uses three transmissive type liquid crystal light valves as light modulation devices. Note that a reflective type liquid crystal light valve may also be used as a light modulation device. Further, a light modulation device other than liquid crystal may be used as the light modulation device, such as, for example, a device that uses a micromirror, such as a digital micromirror device (DMD).

As illustrated in FIG. 1, a projector 1 includes an illumination device 2, a color separation optical system 3, a light modulation device 4R, a light modulation device 4G, and a light modulation device 4B, a light synthesizing optical system 5, and a projection optical system 6. Further, the projector 1 includes a phase modulation element 22 described below. The illumination device 2 exits illumination light WL. The color separation optical system 3 separates the illumination light WL from the illumination device 2 into red light LR, green light LG, and blue light LB. The light modulation device 4R, the light modulation device 4G, and the light modulation device 4B modulate the red light LR, the green light LG, and the blue light LB, respectively, in accordance with image information, and form imaging light of each color. The light synthesizing optical system 5 synthesizes the imaging light of each color from the respective light modulation devices 4R, 4G, 4B. The projection optical system 6 projects the synthesized imaging light from the light synthesizing optical system 5 toward a screen SCR.

As illustrated in FIG. 2, the illumination device 2 exits the illumination light WL of a white color including, among excitation light of a blue color exited from a semiconductor laser, a portion of excitation light B of a blue color exited without wavelength conversion, and fluorescence YL of a yellow color that is produced due to wavelength conversion of the excitation light B by a phosphor wheel 50. The illumination device 2 exits the illumination light WL adjusted to have a substantially uniform illuminance distribution toward the color separation optical system 3. A specific configuration of the illumination device 2 is described below.

As illustrated in FIG. 1, the color separation optical system 3 includes a first dichroic mirror 7a, a second dichroic mirror 7b, a first reflecting mirror 8a, a second reflecting mirror 8b, a third reflecting mirror 8c, and a relay lens 8d.

The first dichroic mirror 7a separates the illumination light WL exited from the illumination device 2 into the red light LR and light including the green light LG and the blue light LB being mixed. Thus, the first dichroic mirror 7a transmits the red light LR, and reflects the green light LG and blue light LB. The second dichroic mirror 7b separates the light including the green light LG and the blue light LB being mixed, into the green light LG and the blue light LB. Thus, the second dichroic mirror 7b reflects the green light LG and transmits the blue light LB.

The first reflecting mirror 8a is disposed in a light path of the red light LR, and reflects the red light LR transmitted through the first dichroic mirror 7a toward the light modulation device 4R. The second reflecting mirror 8b and the third reflecting mirror 8c are disposed in a light path of the blue light LB, and guide the blue light LB transmitted through the second dichroic mirror 7b toward the light modulation device 4B.

The light modulation device 4R, the light modulation device 4G, and the light modulation device 4B are each constituted by a liquid crystal panel. The light modulation device 4R modulates the red light LR in accordance with image information while the red light LR passes through the light modulation device 4R, and forms red imaging light. Similarly, the light modulation device 4G modulates the green light LG in accordance with the image information while the green light LG passes through the light modulation device 4G, and forms green imaging light. The light modulation device 4B modulates the blue light LB in accordance with the image information while the blue light LB is passed through the light modulation device 4B, and forms blue imaging light. At each of an incident side and an exit side of each of the light modulation device 4R, the light modulation device 4G, and the light modulation device 4B, polarization plates (not illustrated) are disposed.

A field lens 10R that collimates the red light LR incident on the light modulation device 4R is provided at the incident side of the light modulation device 4R. A field lens 10G that collimates the green light LG incident on the light modulation device 4G is provided at the incident side of the light modulation device 4G. A field lens 10B that collimates the green light LB incident on the light modulation device 4B is provided at the incident side of the light modulation device 4B.

The light synthesizing optical system 5 is constituted by a cross dichroic prism. The light synthesizing optical system 5 synthesizes the imaging light of each color exited from the light modulation device 4R, the light modulation device 4G, and the light modulation device 4B, respectively, and exits the imaging light thus synthesized toward the projection optical system 6.

The projection optical system 6 is constituted by a plurality of projection lenses. The projection optical system 6 enlarges and projects the imaging light synthesized by the light synthesizing optical system 5 toward the screen SCR. Thus, a color image thus enlarged is displayed on the screen SCR. Note that, the projection optical system 6 may be constituted by one projection lens.

Illumination Device

Next, a configuration of the illumination device 2 will be described.

As illustrated in FIG. 2, the illumination device 2 includes an array light source 30 that exits excitation light, a collimating optical system 40, a light condensing optical system 42, the phosphor wheel 50, a pickup optical system 60, an integrator optical system 110, a polarization conversion element 120, and a superimposing lens 130.

The array light source 30 includes a plurality of semiconductor lasers 31 that exit blue light as the excitation light B that excites a phosphor layer 51 included in the phosphor wheel 50 described below. A peak emission intensity of the semiconductor laser 31 is approximately 445 nm, for example. Note that, instead of the configuration in which the phosphor layer is excited by the blue light, as the array light source, an array light source including a laser light source exiting blue light, a laser light source exiting green light, or a laser light source exiting red light may be used.

Note that, the semiconductor laser 31 may exit color light having a peak wavelength other than 445 nm as long as the light is of a wavelength capable of exciting the phosphor layer 51 described below.

The collimating optical system 40 converts the excitation light B exited from the array light source 30 into parallel light. The collimating optical system 40 is constituted by a plurality of collimating lenses 41 arranged in an array corresponding to an arrangement of the plurality of semiconductor lasers 31, for example. The excitation light B converted to parallel light by passing through the collimating optical system 40 is incident on the light condensing optical system 42.

The light condensing optical system 42 is constituted by, for example, a single convex lens. The light condensing optical system 42 is disposed on an optical axis of the excitation light B exited from the array light source 30, and condenses the excited light B collimated by the light collimating optical system 40 onto the phosphor wheel 50.

The phosphor wheel 50 has a function of transmitting a portion of the excitation light B of a blue color exited from the array light source 30 and converting the remaining portion of the excitation light B to fluorescence. The phosphor wheel 50 includes a rotating substrate 50a, the phosphor layer 51, a dichroic film 52, and a motor 55b. The rotating substrate 50a is formed from, for example, a glass or a resin having optical transparency.

The rotating substrate 50a is formed in a circular shape when viewed from a direction of a rotation axis O. However, an outer shape of the rotating substrate 50a is not limited to a circular shape, and may be, for example, a polygonal shape. The motor 55b rotates the rotating substrate 50a about the predetermined rotation axis O. The rotating substrate 50a rotates in a plane substantially orthogonal to an optical axis of the excitation light B incident on the rotating substrate 50a. The phosphor layer 51 contains phosphor particles that absorb the excitation light B and exit the fluorescence YL of a yellow color including red light and green light. The peak emission intensity of the fluorescence YL is approximately 550 nm, for example.

As the phosphor particles, for example, yttrium aluminum garnet (YAG) group fluorescent substances are used. Note that the material for forming the phosphor particles may be one type or may be a mixture of particles formed using two or more types of materials.

The dichroic film 52 is provided between the phosphor layer 51 and the rotating substrate 50a. The dichroic film 52 transmits the excitation light B and reflects the fluorescence YL.

The fluorescence YL and a portion of the excitation light B transmitted through the phosphor layer 51, that is, blue light B1, are synthesized, thereby generating the illumination light WL of a white color. That is, the illumination light WL is constituted by light including the fluorescence YL and the excitation light B of laser light.

The pickup optical system 60 includes a pickup lens 61 and a pickup lens 62. The pickup optical system 60 captures and substantially collimates the illumination light WL exited from the phosphor layer 51, and then exits the illumination light WL thus collimated toward the integrator optical system 110.

The integrator optical system 110 includes a first lens array 111 and a second lens array 112. The first lens array 111 includes a plurality of lenses arranged in a matrix. The second lens array 112 includes a plurality of lenses corresponding to the plurality of lenses of the first lens array 111. The first lens array 111 divides the illumination light WL from the pickup optical system 60 into a plurality of light beams and condenses each light beam. The second lens array 112 exits the light beams from the first lens array 111 at a predetermined divergence angle.

The polarization conversion element 120 converts light exited from the second lens array 112 into linearly polarized light. The polarization conversion element 120 is provided with, for example, a polarization separation film and a phase difference plate (not illustrated in the drawings). That is, the polarization conversion element 120 converts unpolarized light to uni-directional linearly polarized light.

The superimposing lens 130 superimposes a plurality of the light beams exited from the polarization conversion element 120 in the respective illuminated regions of the light modulation device 4R, the light modulation device 4G, and the light modulation device 4B. That is, the second lens array 112 and the superimposing lens 130 form an image of each lens of the first lens array 111 in the vicinity of an image formation region of the light modulation device 4R, the light modulation device 4G, and the light modulation device 4B.

Optical Device

The optical device of the present exemplary embodiment will now be described.

Figure 3:
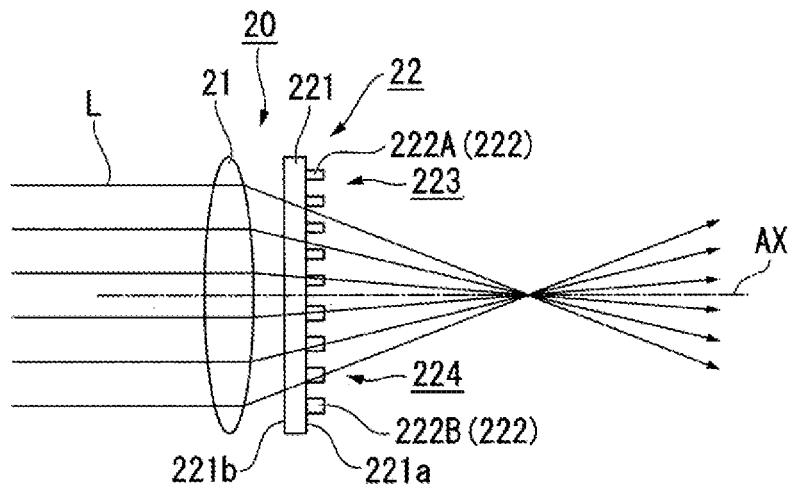
FIG. 3 is a side view of an optical device.

FIG. 3 is a side view of an optical device 20.

In the projector 1 illustrated in FIG. 1 and the illumination device 2 illustrated in FIG. 2, the optical device 20 of the present exemplary embodiment can be applied to a light condensing element such as, for example, the pickup optical system 60, the collimating lens 41, the superimposing lens 130, the relay lens 8d, the field lenses 10R, 10G, or 10B.

As illustrated in FIG. 3, the optical device 20 includes a lens 21 and the phase modulation element 22. The lens 21 is constituted by a spherical lens. The phase modulation element 22 is provided on a light exit side of the lens 21, and modulates phase of incident light L to correct aberration caused by the lens 21.

Figure 4:
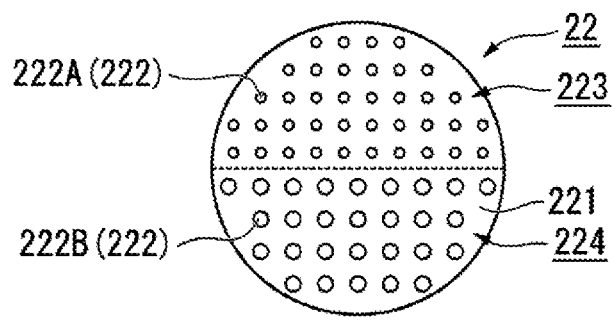
FIG. 4 is a front view of a phase modulation element.
Figure 5:
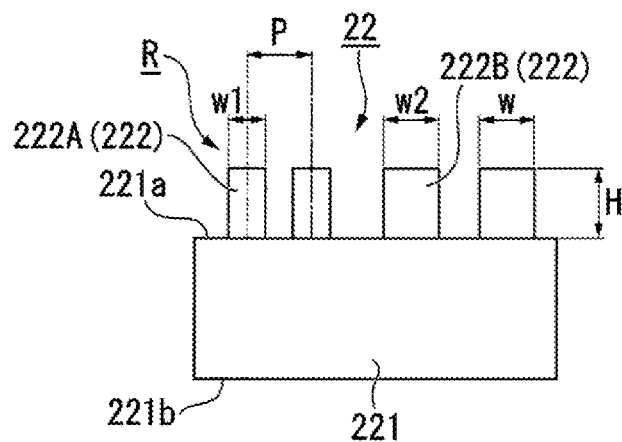
FIG. 5 is a side view of the phase modulation element.

FIG. 4 is a front view of the phase modulation element 22. FIG. 5 is a side view of the phase modulation element 22.

As illustrated in FIG. 4, the phase modulation element 22 includes a substrate 221 (base material), and a plurality of columnar structures 222 provided on a first surface 221a of the substrate 221. As illustrated in FIG. 5, when viewed from a normal direction of the first surface 221a of the substrate 221, the plurality of columnar structures 222 are provided periodically in a two-dimensional manner. The plurality of columnar structures 222 are provided across an entire region of the first surface 221a of the substrate 221. The columnar structure 222 has a diameter in the nm order and is also referred to as a nano-pillar or the like.

The columnar structure 222 is formed from a dielectric material having a high refractive index, such as titanium oxide ($TiO_2$), silicon nitride (SiN), and gallium phosphide (GaP), for example. A shape of the columnar structure 222 is, for example, a rotationally symmetric shape, such as a columnar shape or a rectangular parallelepiped shape. The substrate 221 is constituted by a light-transmitting substrate such as glass ($SiO_2$) having a refractive index lower than the refractive index of the columnar structure 222. The incident light L exited from the lens 21 and incident on the phase modulation element 22 is incident on a second surface 221b of the substrate 221, and exited from the first surface 221a. Note that, in contrast to FIG. 3, the phase modulation element 22 may be disposed in an orientation in which the incident light L is incident on the first surface 221a of the substrate 221, and is exited from the second surface 221b. Note that, the columnar structure 222 may be formed from, for example, a metal material such as gold (Au), silver (Ag), copper (Cu), platinum (Pt), palladium (Pd), nickel (Ni), or aluminum (Al).

The plurality of columnar structures 222 have a refractive index and a pitch that produce a waveguide effect for the incident light L. The refractive index of the columnar structure 222 is within a range of about from 2.2 to 4.0. For example, the refractive index of TiO$_2$, SiN, and GaP, which are the materials of the columnar structure 222, are about from 2.28 to 2.42, about from 2.0 to 2.1, and about from 3.1 to 4.0, respectively.

A thickness of the columnar structure 222, that is, a diameter W of the columnar structure 222 is, for example, about from 50 to 700 nm. A pitch P between the columnar structures 222 adjacent to each other is, for example, about from 100 to 700 nm. Note that, the pitch P is a distance between center axes of the respective columnar structures 222 adjacent to each other. A height H of the columnar structure 222 is about from 100 to 1000 nm.

As illustrated in FIG. 4, when the substrate 221 is viewed from an exit direction of the incident light L, a shape of the substrate 221 is circular. The first surface 221*a* of the substrate 221 includes a first region 223 provided with a plurality of first columnar structures 222A that modulate phase for a first light component, and a second region 224 provided with a plurality of second columnar structures 222B that modulate phase for a second light component having characteristic parameters different from characteristic parameters of the first light component. In the case of the present exemplary embodiment, each of the first region 223 and the second region 224 has a semi-circular shape obtained by dividing a circle forming an outer shape of the substrate 221 into sector-like shapes. Note that, the shape of the substrate 221 does not necessarily have to be circular, and may have other shapes such as a polygonal shape including a square shape.

In the present specification, a characteristic parameter means a parameter indicating a characteristic of light incident on the phase modulation element 22, specifically corresponds to any of a wavelength, an incident angle, or a polarization state.

In the present exemplary embodiment, the first light component and the second light component are different from each other in wavelength as a characteristic parameter of light. In other words, the first surface 221*a* of the substrate 221 is divided into the first region 223 and the second region 224, and the plurality of first columnar structures 222A optimized for a first wavelength are provided in the first region 223, and the plurality of second columnar structures 222B optimized for a second wavelength different from the first wavelength are provided in the second region 224.

In order to perform optimization for each of the first light component having the first wavelength and the second light component having the second wavelength, the first columnar structure 222A and the second columnar structure 222B are different from each other in at least one structural parameter among the diameter, pitch, height, and shape of the columnar structure 222.

In the present specification, the structural parameter refers to a parameter related to structure of the columnar structure 222, and specifically corresponds to any of the diameter, pitch, height, and shape of the columnar structure 222.

The phase modulation element 22 acts as an optical resonator of a nano-order size due to a light confinement effect within a formation region R of the columnar structure 222. Further, as described below, the phase modulation element 22, by being provided with the columnar structures 222A and 222B having different diameters W1 and W2, respectively, can modulate phase of light passing through the phase modulation element 22, and can correct aberration caused by other optical elements.

Phase modulation is achieved by a waveguide effect in the formation region R of the columnar structure 222. Given λ as a wavelength of the incident light L, neff as an effective refractive index of the columnar structure 222, and H as the height of the columnar structure 222, an amount of phase modulation φ is expressed by the following equation (1).

$$\Phi = 2\pi/\lambda \times (\text{neff} \times H) \tag{1}$$

Here, a waveguide mode of light in the phase modulation element 22 will now be described.

When light is incident on the formation region of the columnar structure 222, a waveguide of the light resulting from two waveguide modes described below is produced.

Figure 7:
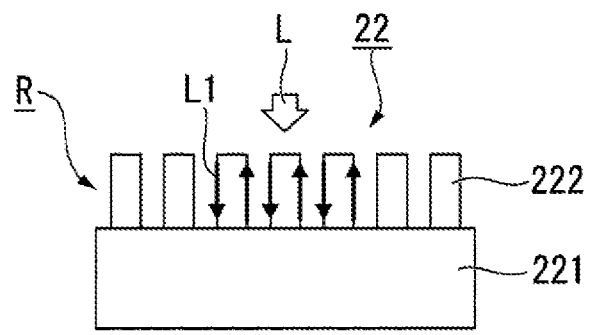
FIG. 7 is a schematic diagram illustrating a concept of a vertical waveguide mode.
Figure 8:
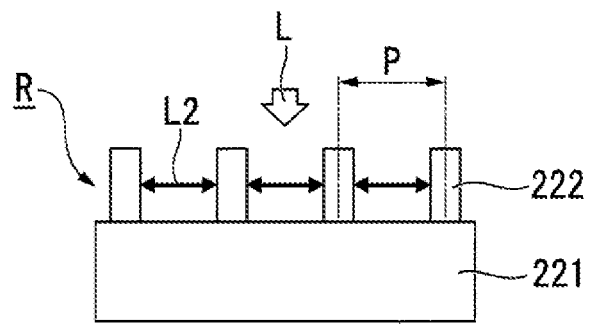
FIG. 8 is a schematic diagram illustrating a concept of a horizontal waveguide mode.

FIG. 7 is a schematic diagram illustrating a concept of a vertical waveguide mode. FIG. 8 is a schematic diagram illustrating a concept of a horizontal waveguide mode.

As illustrated in FIG. 7, the light L vertically incident on the phase modulation element 22 is reflected vertically at an interface between the formation region R of the columnar structure 222 and a space of an outer side thereof, and thus reflected light L1 travels back and forth within the formation region R of the columnar structure 222 and is guided while producing resonance. This waveguide mode is referred to as the vertical waveguide mode. The vertical waveguide mode is a waveguide mode that is produced based on the same principle as the Fabry-Perot resonator.

Further, light incident on the phase modulation element 22 is diffracted by a predetermined angle in accordance with the pitch P of the columnar structures 222. At this time, the plurality of columnar structures 222 act as a diffraction lattice. In particular, under conditions where the diffraction angle is 90°, diffraction light L2 is guided in a direction perpendicular to the incident light L, as illustrated in FIG. 8. This waveguide mode is referred to as the horizontal waveguide mode.

In the phase modulation element 22, propagation of light by the vertical waveguide mode and propagation of light by the horizontal waveguide mode overlap with each other in the air, and phase of light exited from the phase modulation element 22 is determined.

Here, the effective refractive index neff in equation (1) depends on the diameter W of the columnar structure 222. As a result, the larger the diameter W of the columnar structure 222, the greater the confinement of light, resulting from the basic mode, into the columnar structure 222. Thus, varying the diameter W of the columnar structure 222 changes the waveguide mode as well as the effective refractive index neff. As a result, even when the height of the columnar structure 222 is constant, phase modulation is possible.

Here, the present inventors performed a simulation of an amount of phase shift when the diameter W of the columnar structure 222 was changed, using the finite-difference time-domain (FDTD) method. Here, only the diameter W of the columnar structure 222 was changed, and the pitch and height of the columnar structure 222 were kept constant.

Figure 6:
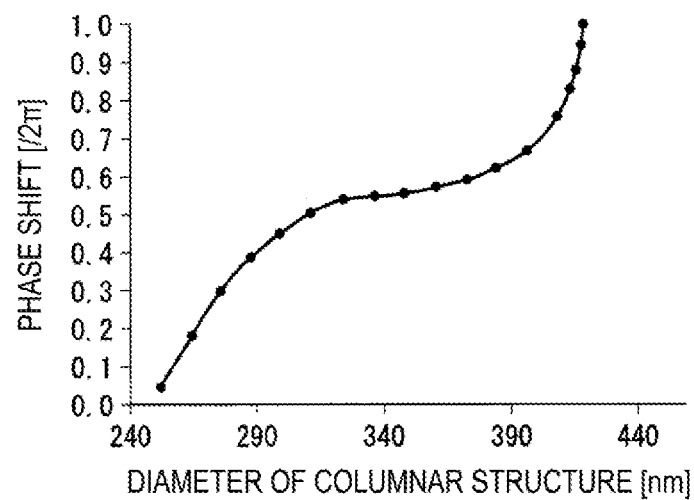
FIG. 6 is a graph showing a relationship between diameter of a columnar structure and amount of phase shift.

A graph of the simulation results is illustrated in FIG. 6. A horizontal axis of the graph is the diameter of the columnar structure (nm) and a vertical axis of the graph is the amount of phase shift (/2π).

As illustrated in FIG. 6, when the diameter W of the columnar structure 222 was changed from 250 nm to 420 nm, the amount of phase shift (/2π) could be changed from approximately 0.05 to 1. That is, it was found that when the diameter W of the columnar structure 222 is increased, the amount of phase modulation can be increased. Thus, when the diameter W of the columnar structure 222 is changed according to a position in an irradiation region of the incident light L, it is possible to change the amount of phase modulation.

In addition, the present inventors simulated wavelength dependence of light intensity distribution for the phase modulation element 22 optimally designed for monochromatic light, that is, light having a specific wavelength. Here, a phase modulation element optimally designed for incident light with a wavelength of 550 nm was used.

Figure 9:
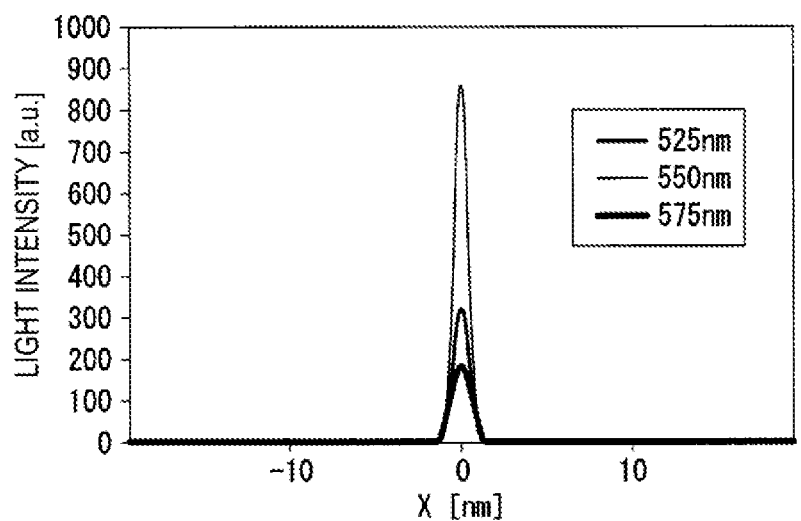
FIG. 9 is a graph showing wavelength dependence of light intensity by the phase modulation element.

A graph of the simulation results is illustrated in FIG. 9. A horizontal axis of the graph indicates distance X (μm) from a focal position of a lens and a vertical axis of the graph indicates light intensity (a.u.).

As illustrated in FIG. 9, light intensity sufficiently large for the incident light with the wavelength of 550 nm is obtained, but as a shift of the wavelength of the incident light from a design wavelength increases, for example, from 550 nm that is a design value to 525 nm or 575 nm, the light intensity decreases to half or less of design light intensity. In other words, it was found that desired phase modulation was not performed for a light component having a wavelength other than the design wavelength, since collection efficiency decreases rapidly due to the shift of the wavelength of the incident light. The above phase modulation element can be utilized only for a single color display projector.

Compared to this, in the phase modulation element 22 of the present exemplary embodiment, one number of the substrate 221 is divided into the two regions, that is, the first region 223 and the second region 224, and the respective two regions are provided with the plurality of columnar structures 222 that are optimized for light components having wavelengths different from each other respectively. In general, aberrations produced in a single spherical lens can be reduced by performing phase modulation using a plurality of other lenses, but this method has a disadvantage that an optical system becomes larger. On the other hand, in the optical device 20 of the present exemplary embodiment, since the phase modulation element 22 that is a thin type is inserted as a subsequent stage of the lens 21, it is sufficient that only a space as thick as the substrate 221 is ensured, and the optical device 20 for which resolution of a projected image is high, and that is a compact type can be obtained.

Also, a design approach for a phase modulation element capable of supporting multiple wavelengths is proposed in an article ("Achromatic Metalens over 60 nm Bandwidth in the Visible and Metalens with Reverse Chromatic Dispersion", Nano Letters, 2017, 17, pp 1819-1824). However, in this approach, there is a problem that multi-wavelength support and efficiency have a trade-off relationship, and design of an element is complex and highly difficult, and collection efficiency is low.

On the other hand, a phase modulation element for a single wavelength has high collection efficiency, and a design approach thereof is simple. Thus, in the phase modulation element 22 of the present exemplary embodiment, when the columnar structure 222A and 222B having structural parameters different from each other respectively, are divided and disposed in the two regions 223 and 224 respectively, while there is a disadvantage that a region where the wavelength of the incident light L does not match the design wavelength occurs, an effect is obtained that the phase modulation element 22 capable of supporting the incident light L having a plurality of wavelengths can be easily realized.

Accordingly, even when the incident light L includes a plurality of light components having wavelengths different from each other respectively, the optical device 20 having a compact shape and minimal image quality deterioration caused by various aberrations such as spherical aberration, comma aberration, astigmatism, image surface curvature, and distortion aberration can be realized.

Note that, a wavelength filter having the same distribution as the design wavelength for each of the divided regions 223 and 224 may be disposed as a preceding stage of the phase modulation element 22. Accordingly, noise light generated when the incident light L having a wavelength different from the design wavelength is incident on a specific region can be reduced, and the disadvantage described above can be eliminated.

In the optical device 20 of the present exemplary embodiment, the lens 21 and the phase modulation element 22 are configured as separate members, making it easier to manufacture the phase modulation element 22 and obtain desired correction performance.

In addition, in the present exemplary embodiment, because the shape of the columnar structure 222 is a columnar, or other rotationally symmetric shape, the effect of structural birefringence does not occur in the phase modulation element 22, and the effect of aberration correction is obtained without relying on the polarization state of the incident light L. Note that, the shape of the columnar structure 222 need not necessarily be rotationally symmetric, such as a columnar shape.

With use of the optical device 20 described above, the projector 1 according to the present exemplary embodiment can achieve a high resolution of the projected image, a superior display quality, and a reduced size.

As in the present exemplary embodiment, when the phase modulation element 22 having the regions 223 and 224 corresponding to light components having wavelengths different from each other respectively is applied to the projector 1, for example, the phase modulation element 22 may be used for the pickup optical system 60 as a subsequent stage of the phosphor wheel 50. In the pickup optical system 60, the excitation light B exited from the phosphor wheel 50 and the fluorescent light YL having Lambert distribution are different from each other in emission intensity distribution. Thus, a vicinity of a center of the phase modulation element 22 is designed for a wavelength of blue light, and a vicinity of a periphery of the phase modulation element 22 is designed for a wavelength of yellow light. Thus, an optical system for which light loss is low and with which uniform light intensity distribution is obtained can be achieved.

Second Exemplary Embodiment

Below, a second exemplary embodiment according to the present disclosure will be described with reference to FIG. 10.

A basic configuration of an optical device according to the second exemplary embodiment is similar to that of the first exemplary embodiment, and design of a columnar structure in each region of a phase modulation element is different from that in the first exemplary embodiment. Therefore, the overall configuration of the optical device will not be described.

In the present exemplary embodiment as well, similar to the first exemplary embodiment, a first surface of a substrate includes a first region provided with a plurality of first columnar structures that modulate phase for a first light component, and a second region provided with a plurality of second columnar structures that modulate phase for a second light component.

In the present exemplary embodiment, the first light component and the second light component are different from each other in incident angle as a characteristic parameter of light. In other words, the first surface of the substrate is divided into the first region and the second region, the plurality of first columnar structures optimized for a first incident angle are provided in the first region, and the plurality of second columnar structures optimized for a second incident angle different from the first incident angle are provided in the second region.

In order to perform optimization for each of the first light component having the first incident angle and the second light component having the second incident angle, the first columnar structure and the second columnar structure are different from each other in at least one structural parameter among a diameter, pitch, height, and shape of the columnar structure.

The present inventors simulated incident angle dependence of light intensity distribution for a phase modulation element optimally designed for light having a specific wavelength. Here, a phase modulation element optimally designed for incident light with an incident angle of 0° was used.

Figure 10:
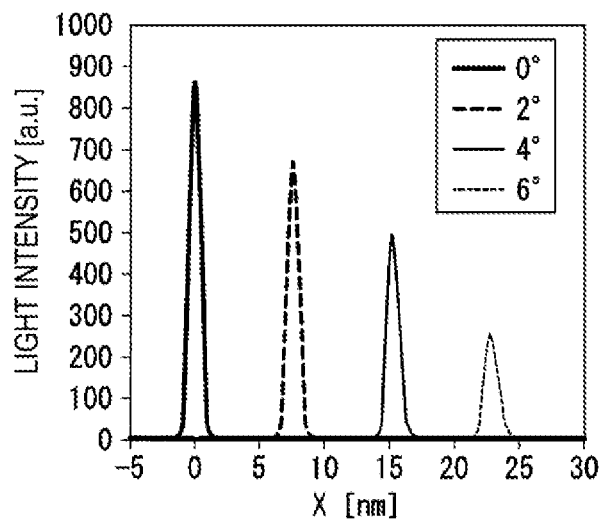
FIG. 10 is a graph showing incident angle dependence of light intensity by the phase modulation element.

A graph of the simulation results is illustrated in FIG. 10. A horizontal axis of the graph indicates distance X (μm) from a focal position of a lens and a vertical axis of the graph indicates light intensity (a.u.).

As illustrated in FIG. 10, although sufficiently large light intensity is obtained for the incident light with the incident angle of 0°, the light intensity decreases rapidly as a shift from a design incident angle increases, for example, from 0° that is the design incident angle, to 2°, 4°, and 6°. In other words, it was found that desired phase modulation was not performed for a light component having an incident angle other than the design incident angle, since collection efficiency decreases rapidly due to the shift of the incident angle. Thus, it is difficult to use this phase modulation element in an optical system and a zoom lens on which light having a wide incident angle range is likely to be incident.

Compared to this, in the phase modulation element of the present exemplary embodiment, in each of the two regions on the substrate, the plurality of columnar structures that are optimized for light components having incident angles different from each other respectively are provided. Accordingly, a phase modulation element capable of supporting light having a plurality of incident angles can be easily realized.

Third Exemplary Embodiment

Next, a third exemplary embodiment of the present disclosure will be described.

A basic configuration of an optical device according to the third exemplary embodiment is similar to that of the first exemplary embodiment, and design of a columnar structure in each region of a phase modulation element is different from that in the first exemplary embodiment. Therefore, the overall configuration of the optical device will not be described.

In the present exemplary embodiment as well, similar to the first exemplary embodiment, a first surface of a substrate includes a first region provided with a plurality of first columnar structures that modulate phase for a first light component, and a second region provided with a plurality of second columnar structures that modulate phase for a second light component.

In the present exemplary embodiment, the first light component and the second light component are different from each other in polarization state as a characteristic parameter of incident light. In other words, the first surface of the substrate is divided into the first region and the second region, the plurality of first columnar structures optimized for incident light having a first polarization state are provided in the first region, and the plurality of second columnar structures optimized for incident light having a second polarization state different from the first polarization state are provided in the second region.

In order to perform optimization for each of the first light component having the first polarization state and the second light component having the second polarization state, the first columnar structure and the second columnar structure are different from each other in at least one structural parameter among a diameter, pitch, height, and shape of the columnar structure.

As in the first exemplary embodiment, when a shape of the columnar structure is a rotationally symmetric shape such as a columnar shape, phase modulation characteristics do not depend on a polarization state of incident light, but a degree of freedom of design of the columnar structure is limited, and on the other hand, when the shape of the columnar structure is not rotationally symmetric, the number of design parameters of the columnar structure increases and the degree of freedom of design increases, however, the phase modulation characteristics depend on a polarization state of incident light.

Compared to this, in the phase modulation element of the present exemplary embodiment, in each of the two regions on the substrate, the plurality of columnar structures that are optimized for light components having polarization states different from each other respectively are provided. Accordingly, a phase modulation element capable of supporting light having a plurality of polarization states can be easily realized.

Note that, a polarization filter having the same polarization distribution as a polarization state of divided regions may be disposed as a preceding stage of a phase modulation element. Accordingly, noise light generated when incident light having a polarization state different from that of design polarization is incident on a specific region can be reduced.

About Structural Parameters of Columnar Structure

As described above, even when each the region is optimized for any of the characteristic parameters of the incident light among the wavelength, the incident angle, and the polarization state, any of the structural parameters among the diameter, the pitch, the height, and the shape of the columnar structure may be made different for each the region. However, as described below, there are structural parameters of the columnar structure with the greatest impact on each the characteristic parameter.

Specifically, as in the first exemplary embodiment, when the design wavelength is made different for each the region, impact given by the pitch of the columnar structure is the greatest. As in the second exemplary embodiment, when the design incident angle is made different for each the region, impact given by the diameter of the columnar structure is the greatest. As in the third exemplary embodiment, when the design polarization state is made different for each the region, impact given by a cross-sectional shape of the columnar structure is the greatest. However, when each the characteristic parameter of incident light is made different, only the structural parameters described above are not necessarily made different. It is also conceivable that other structural parameter is made different simultaneously, in addition to the structural parameter with the greatest impact. In the above description, only the structural parameters with the greatest impact are listed.

About Design Wavelength

The pitch P of the columnar structure of the phase modulation element, as a condition for the phase modulation element to function as a lens, needs to satisfy a relational expression derived from a Nyquist's sampling theorem represented by equation (1) below.

$$P < \lambda / N.A. \tag{1}$$

$\lambda$: wavelength, N.A.: numeral aperture of lens

Thus, a maximum value of the pitch P of the columnar structure varies depending on the wavelength. Furthermore, in a case of a phase modulation element that uses waveguide mode resonance, a resonance wavelength depends on the pitch P of the columnar structure, so the pitch P of the columnar structure varies depending on a design wavelength of the phase modulation element.

About Design Incident Angle

Figure 11:
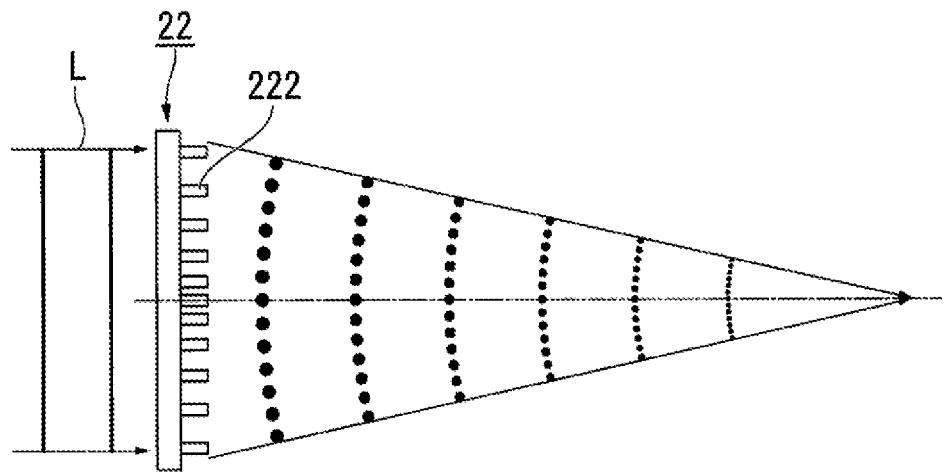
FIG. 11 is a diagram illustrating an equiphasic surface when light is normally incident on the phase modulation element.
Figure 12:
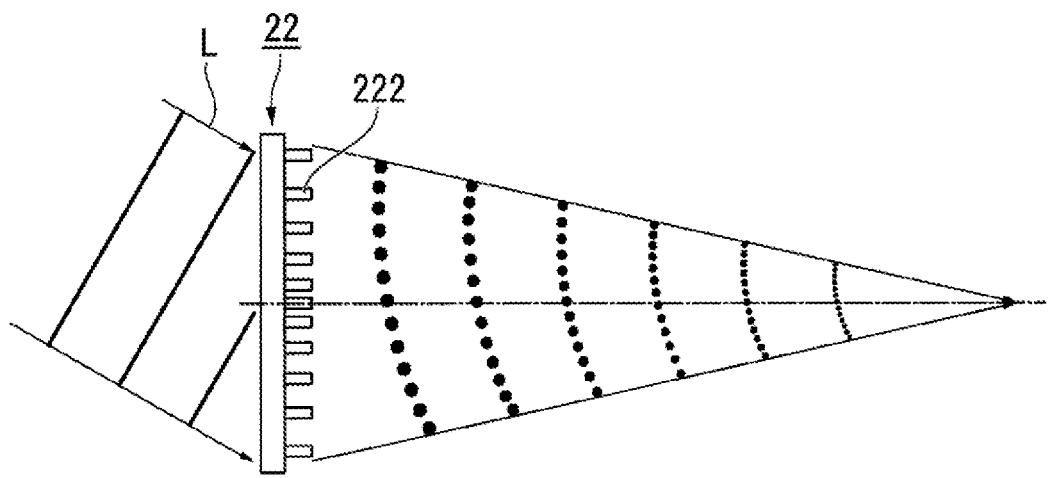
FIG. 12 is a diagram illustrating an equiphasic surface when light is obliquely incident on the phase modulation element.

FIG. 11 is a diagram illustrating an equiphasic surface T when the incident light L is normally incident on the phase modulation element 22. FIG. 12 is a diagram illustrating the equiphasic surface T when the incident light L is obliquely incident on the phase modulation element 22.

As illustrated in FIG. 11, when incident light L formed of planar waves is normally incident on the phase modulation element 22, all of waves of the same phase are incident on the columnar structure 222. On the other hand, as illustrated in FIG. 12, when the incident light L formed from planar waves is obliquely incident on the phase modulation element 22, phase of a light wave incident on the columnar structure 222 is different for each the columnar structure 222.

Thus, both a phase difference for obtaining a lens function, and a phase difference for correcting a phase difference due to oblique incidence need to be generated in the phase modulation element 22. As a result, an amount of change in phase difference generated between the columnar structures 222 adjacent to each other is larger when the incident light L is obliquely incident than when the incident light L is normally incident. Since the phase difference made to be generated in the columnar structure 222 can be adjusted with the diameter of the columnar structure 222, the amount of change in the diameter between the columnar structures adjacent to each other varies depending on the design incident angle.

About Design Polarization

When a shape of a columnar structure is rotationally symmetric, such as a column, it is possible to generate a desired phase difference without depending on an incident polarization state. On the other hand, when a shape of a columnar structure is non-rotationally symmetric, for example, a square pillar having a rectangular cross section, a delay of a wave front is asymmetrically generated depending on a vibration direction of incident light, thus a phase difference generated is greatly affected by a polarization state.

Thus, when designing a phase modulation element that generates a desired phase difference only for light in a particular polarization state, a shape of a columnar structure is non-rotationally symmetric, thus cross-sectional shapes of the columnar structures are different from each other respectively depending on a design polarization direction.

Fourth Exemplary Embodiment

Below, a fourth exemplary embodiment according to the present disclosure will be described with reference to FIG. 13.

A basic configuration of an optical device according to the fourth exemplary embodiment is similar to that of the first exemplary embodiment, but a configuration of a phase modulation element is different from that in the first exemplary embodiment. Therefore, the overall configuration of the optical device will not be described.

Figure 13:
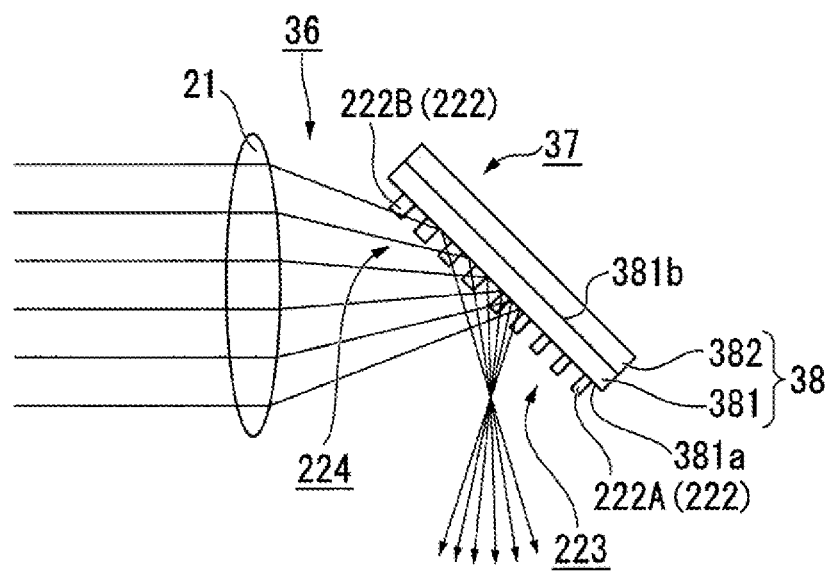
FIG. 13 is a side view of an optical device according to a fourth exemplary embodiment.

FIG. 13 is a side view of the optical device according to the fourth exemplary embodiment.

In FIG. 13, the components common to those of FIG. 3 of the first exemplary embodiment are denoted using the same reference numerals, and the descriptions thereof are omitted.

While the transmission-type phase modulation element is used in the optical devices according to the first to third exemplary embodiments, a reflection-type phase modulation element 37 is used in an optical device 36 according to the fourth exemplary embodiment. Accordingly, the optical device 36 of the present exemplary embodiment can be applied to a location in the projector 1 illustrated in FIG. 1 in which a reflective element such as, for example, the first reflecting mirror 8a, the second reflecting mirror 8b, the third reflecting mirror 8c, is used.

Figure 14:
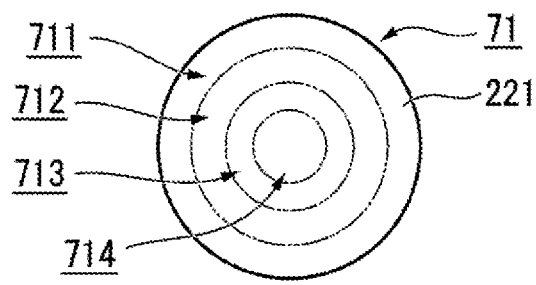
FIG. 14 is a front view of a phase modulation element according to a first modified example.

As illustrated in FIG. 14, the optical device 36 of the present exemplary embodiment includes the lens 21 and the phase modulation element 37. The phase modulation element 37 includes a substrate 38 and the plurality of columnar structures 222 provided on the substrate 38. The substrate 38 includes a spacer layer 381 provided with a first surface 381a and a second surface 381b, and a reflection layer 382 provided on the second surface 381b of the spacer layer 381.

For example, $SiO_2$ or the like is used as a constituent material of the spacer layer 381. The spacer layer 381 has a refractive index lower than the refractive index of the columnar structure 222. The refractive index of the spacer layer 381 is, for example, about from 1.3 to 2.1. As described in the first exemplary embodiment, because the refractive index of the columnar structure 222 is about from 2.2 to 4.0, a difference between the refractive index of the columnar structure 222 and the refractive index of the spacer layer 381 may be 0.1 or greater. Further, a metal film having high reflectivity or a dielectric multilayer film is used as the constituent material of the reflection layer 382.

Since the phase modulation element 37 of the present exemplary embodiment is the reflection-type phase modulation element, light exited from the lens 21 is incident on the first surface 381a of the spacer layer 381, is reflected by the reflection layer 382, and exited from the first surface 381a of the spacer layer 381 toward an optical system of a subsequent stage.

The other components of the optical device 36 are the same as those in the first exemplary embodiment. That is, the first surface of the substrate 38 includes the first region 223 provided with the plurality of first columnar structures 222A that modulate phase for a first light component, and the second region 224 provided with the plurality of second columnar structures 222B that modulate phase for a second light component having characteristic parameters different from characteristic parameters of the first light component. The first light component and the second light component are different from each other in wavelength as the characteristic parameter of light. Note that, the first light component and the second light component, as the characteristic parameters of light, may have different incident angles different from each other respectively, as in the second exemplary embodiment, or may have polarization states different from each other respectively, as in the third exemplary embodiment.

In the present exemplary embodiment as well, similar effects to those of the first to third exemplary embodiments can be obtained, such as an effect that the phase modulation element 37 can be easily realized that is capable of supporting light having a plurality of characteristic parameters such as a plurality of wavelengths, a plurality of incident angles, and a plurality of polarization states.

In addition, in the present exemplary embodiment, because the phase modulation element 37 and the reflecting mirror are integrated, the optical device 36 having a compact shape and minimal image quality deterioration caused by various aberrations can be achieved.

Modified Example Regarding Disposition of Multiple Regions

In the phase modulation elements of the first to fourth exemplary embodiments, more regions may be provided in addition to the first region and the second region. Also, the regions may be disposed as described below.

FIG. 14 is a front view of a phase modulation element 71 according to a first modified example.

As illustrated in FIG. 14, in the phase modulation element 71 of the first modified example, a first surface of the substrate 221 includes a first region 711 provided with a plurality of first columnar structures (not illustrated) that modulate phase for a first light component, a second region 712 provided with a plurality of second columnar structures (not illustrated) that modulate phase for a second light component having characteristic parameters different from characteristic parameters of the first light component, a third region 713 provided with a plurality of third columnar structures (not illustrated) that modulate phase for a third light component having characteristic parameters different from the characteristic parameters of the first light component and the second light component, and a fourth region 714 provided with a plurality of fourth columnar structures (not illustrated) that modulate phase for a fourth light component having characteristic parameters different from the characteristic parameters of the first light component, the second light component, and the third light component.

In the present modified example, the first region 711, the second region 712, the third region 713, and the fourth region 714 are disposed concentrically with respect to a center of the substrate 221.

In the present modified example as well, similar effects to those of the first to fourth exemplary embodiments can be obtained, such as an effect that the phase modulation element 71 can be easily realized that is capable of supporting light having a plurality of characteristic parameters such as a plurality of wavelengths, a plurality of incident angles, and a plurality of polarization states.

In addition, in the case of the present modified example, the first region 711, the second region 712, the third regions 713, and the fourth regions 714 are concentrically disposed, making it possible to cause incident light to be incident on any of the plurality of regions 711, 712, 713, and 714, even when an incident position of the incident light shifts from a position on the design.

Figure 15:
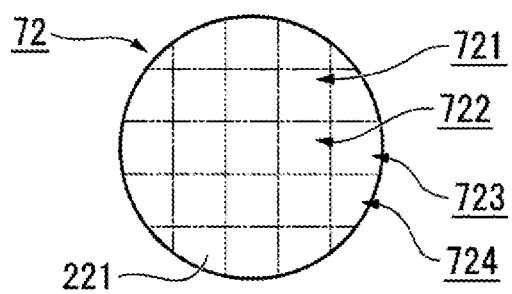
FIG. 15 is a front view of a phase modulation element according to a second modified example.

FIG. 15 is a front view of a phase modulation element 72 according to a second modified example.

As illustrated in FIG. 15, in the phase modulation element 72 of the second modified example as well, similar to the first modified example, a first surface of the substrate 221 includes a first region 721, a second region 722, a third region 723, and a fourth region 724.

In the present modified example, the first region 721, the second region 722, the third region 723, and the fourth region 724 are disposed in a lattice shape with respect to a center of the substrate 221. How to dispose the first region 721, the second region 722, the third region 723, and the fourth region 724 on respective rectangular regions obtained by dividing the substrate 221 into a lattice shape is arbitrary. For example, it is also possible that disposition of the four regions is not regular, and the first region 721, the second region 722, the third region 723, and the fourth region 724 are disposed randomly.

In the present modified example as well, similar effects to those of the first to fourth exemplary embodiments can be obtained, such as an effect that the phase modulation element 72 can be easily realized that is capable of supporting light having a plurality of characteristic parameters such as a plurality of wavelengths, a plurality of incident angles, and a plurality of polarization states.

In particular, when the first region 721, the second region 722, the third region 723, and the fourth region 724 are disposed randomly, even when an incident position of incident light shifts from a design position, uneven distribution of incident light intensity in a region corresponding to a specific characteristic parameter is suppressed.

Figure 16:
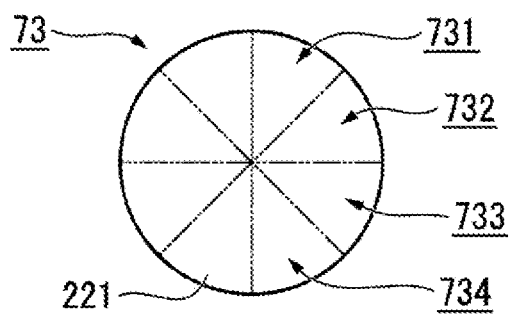
FIG. 16 is a front view of a phase modulation element according to a third modified example.

FIG. 16 is a front view of a phase modulation element 73 according to a third modified example.

As illustrated in FIG. 16, in the phase modulation element 73 of the third modified example as well, similar to the first modified example, a first surface of the substrate 221 includes a first region 731, a second region 732, a third region 733, and a fourth region 734.

In the present modified example, the first region 731, the second region 732, the third region 733, and the fourth region 734 are disposed in a sector-like shape with respect to a center of the substrate 221. The first region 731, second region 732, third region 733, and fourth region 734 may be disposed in this order in a circumferential direction of the substrate 221, or may be disposed in a random order.

In the present modified example as well, similar effects to those of the first to fourth exemplary embodiments can be obtained, such as an effect that the phase modulation element 73 can be easily realized that is capable of supporting light having a plurality of characteristic parameters such as a plurality of wavelengths, a plurality of incident angles, and a plurality of polarization states.

In particular, in the present modified example, when light is incident on a center of the substrate 221, since all of the regions 731, 732, 733, and 734 are collected and disposed, at the center of the substrate 221 at which light intensity is high, phase modulation for a plurality of wavelengths, incident angles, and polarization states can be reliably performed.

Figure 17:
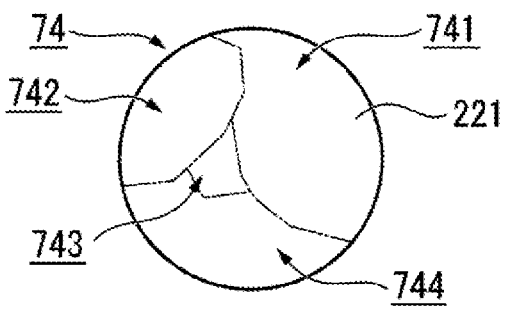
FIG. 17 is a front view of a phase modulation element according to a fourth modified example.

FIG. 17 is a front view of a phase modulation element 74 according to a fourth modified example.

As illustrated in FIG. 17, in the phase modulation element 74 of the fourth modified example as well, similar to the first modified example, a first surface of the substrate 221 includes a first region 741, a second region 742, a third region 743, and a fourth region 744.

In the present modified example, the first region 741, the second region 742, the third region 743, and the fourth region 744 are disposed on the substrate 221 in respective indefinite shapes. As illustrated in FIG. 17, areas of the respective regions 741, 742, 743, and 744 may be different from each other as appropriate, or may be identical to each other.

In the present modified example as well, similar effects to those of the first to fourth exemplary embodiments can be obtained, such as an effect that the phase modulation element 74 can be easily realized that is capable of supporting light having a plurality of characteristic parameters such as a plurality of wavelengths, a plurality of incident angles, and a plurality of polarization states.

In particular, in the case of the present modified example, when light intensity distribution within a plane of incident light is uneven, the areas of the respective regions 741, 742, 743, and 744 of specific specifications can be increased to improve light utilization efficiency, or the areas of the respective regions 741, 742, 743, and 744 can be adjusted to adjust intensity of a light component having a specific characteristic parameter.

Note that the technical scope of the present disclosure is not limited to the above-described exemplary embodiment, and various modifications can be made to the above-described exemplary embodiment without departing from the spirit and gist of the present disclosure.

For example, in the exemplary embodiment described above, the examples in which each of the regions of the phase modulation element corresponds to one characteristic parameter of any one of the wavelength, the incident angle, and the polarization state of light, but each of the regions of the phase modulation element may correspond to two or more number of the characteristic parameters. Further, the phase modulation element may also have a lens function, and in this case, the phase modulation element need not necessarily be used in combination with a lens.

Further, while the case in which the columnar structure has a columnar shape, a rectangular parallelepiped shape, or the like is illustrated in the exemplary embodiments described above, the columnar structure may have a tapered shape with a surface area of a bottom surface greater than a surface area of a top surface. According to this configuration, even when the columnar structure is formed at a curved surface of the lens, for example, the parallelism between the side surfaces of adjacent columnar structures can be maintained. For example, an inclination angle of the tapered surface may be about 15° or less with respect to the normal direction. Furthermore, an example of a means for forming a nano-order columnar structure, a nanoimprint method may be cited. When a columnar structure is formed using the nanoimprint method, as far as the columnar structure has a tapered shape, a peeling operation when peeling a transfer mold from a material of the columnar structure can be easily performed, and the columnar structure having a desired shape is easily obtained.

Further, the specific configuration of each component constituting the phase modulation element, such as the shape, quantity, arrangement, or material of the components is not limited to that of exemplary embodiments described above, and may be appropriately changed. Additionally, in the exemplary embodiments described above, the illumination device includes the light source that exits the excitation light of a blue color and the phosphor wheel, and the present disclosure has been applied to the illumination device that uses the method that the fluorescence is obtained by irradiating the phosphor layer on the phosphor wheel with the excitation light, but the present disclosure may be applied to a projector that is provided with a laser light source exiting blue light, a laser light source exiting green light, and a laser light source exiting red light, and directly displays an image using the respective color light from these laser light sources.

Further, the phase modulation element of the above-described exemplary embodiment can be applied not only to the optical system of the projector illustrated in FIG. 1, but also to a scanner device, a sensing infrared wavelength projection optical device for an interactive projector, an imaging device such as a camera, and the like. Furthermore, the optical device is not limited to a projector, and can also be applied to a display device such as a head-mounted display.

What is claimed is:

1. A phase modulation element, comprising:
a substrate; and
a plurality of columnar structures provided at a first surface of the substrate, wherein
the plurality of columnar structures have a refractive index and a pitch that produce a waveguide effect for incident light including a first light component, and a second light component having characteristic parameters different from characteristic parameters of the first light component, and
the first surface of the substrate includes a first region provided with a plurality of first columnar structures that modulate phase for the first light component, and a second region provided with a plurality of second columnar structures that modulate phase for the second light component,
and further wherein the substrate includes a spacer layer having a first surface and a second surface, and a reflection layer,
the plurality of columnar structures are provided at the first surface of the spacer layer,
the reflection layer is provided at the second surface of the spacer layer, and
the incident light is incident on the first surface of the spacer layer, and reflected by the reflection layer, and moreover exits from the first surface of the spacer layer.

2. The phase modulation element according to claim 1, wherein the first light component and the second light component are different from each other in at least one characteristic parameter among a wavelength, an incident angle, and a polarization state.

3. The phase modulation element according to claim 2, wherein the first columnar structure and the second columnar structure are different from each other in at least one structural parameter among a diameter, a pitch, a height, and a shape.

4. The phase modulation element according to claim 1, wherein
when the substrate is viewed from an exit direction of the incident light, a shape of the substrate is circular, and
the first region and the second region are disposed in any configuration of a concentric circle, a lattice, a sector-like shape, and an irregular-shape.

5. The phase modulation element according to claim 1, wherein
the substrate includes a light-transmitting substrate having a first surface and a second surface,
the plurality of columnar structures are provided at the first surface of the light-transmitting substrate, and
the incident light is incident on one of the first surface and the second surface of the light-transmitting substrate, and exits from another of the first surface and the second surface.

6. A display device, comprising the phase modulation element according to claim 1.

7. The display device according to claim 6, wherein the first light component and the second light component are different from each other in at least one characteristic parameter among a wavelength, an incident angle, and a polarization state.

8. The display device according to claim 7, wherein the first columnar structure and the second columnar structure are different from each other in at least one structural parameter among a diameter, a pitch, a height, and a shape.

9. The display device according to claim 6, wherein
when the substrate is viewed from an exit direction of the incident light, a shape of the substrate is circular, and
the first region and the second region are disposed in any configuration of a concentric circle, a lattice, a sector-like shape, and an irregular-shape.

10. The display device according to claim 6, wherein
the substrate includes a light-transmitting substrate having a first surface and a second surface,
the plurality of columnar structures are provided at the first surface of the light-transmitting substrate, and
the incident light is incident on one of the first surface and the second surface of the light-transmitting substrate, and exits from another of the first surface and the second surface.

11. A phase modulation element, comprising:
a substrate; and
a plurality of columnar structures provided at a first surface of the substrate, wherein
the plurality of columnar structures have a refractive index and a pitch that produce a waveguide effect for incident light including a first light component, and a second light component having characteristic parameters different from characteristic parameters of the first light component, and
the first surface of the substrate includes a first region provided with a plurality of first columnar structures that modulate phase for the first light component, and a second region provided with a plurality of second columnar structures that modulate phase for the second light component,
and further wherein the columnar structures respectively of the first and second regions of the substrate first surface each form respective sectors which have the same characteristics for columnar structures in its respective sector and which differ between the two sectors, and
the sectors are each semi-circular in shape.

* * * * *